July 3, 1934.  F. W. SARGENT  1,965,159
BRAKE SHOE KEY
Filed May 5, 1932
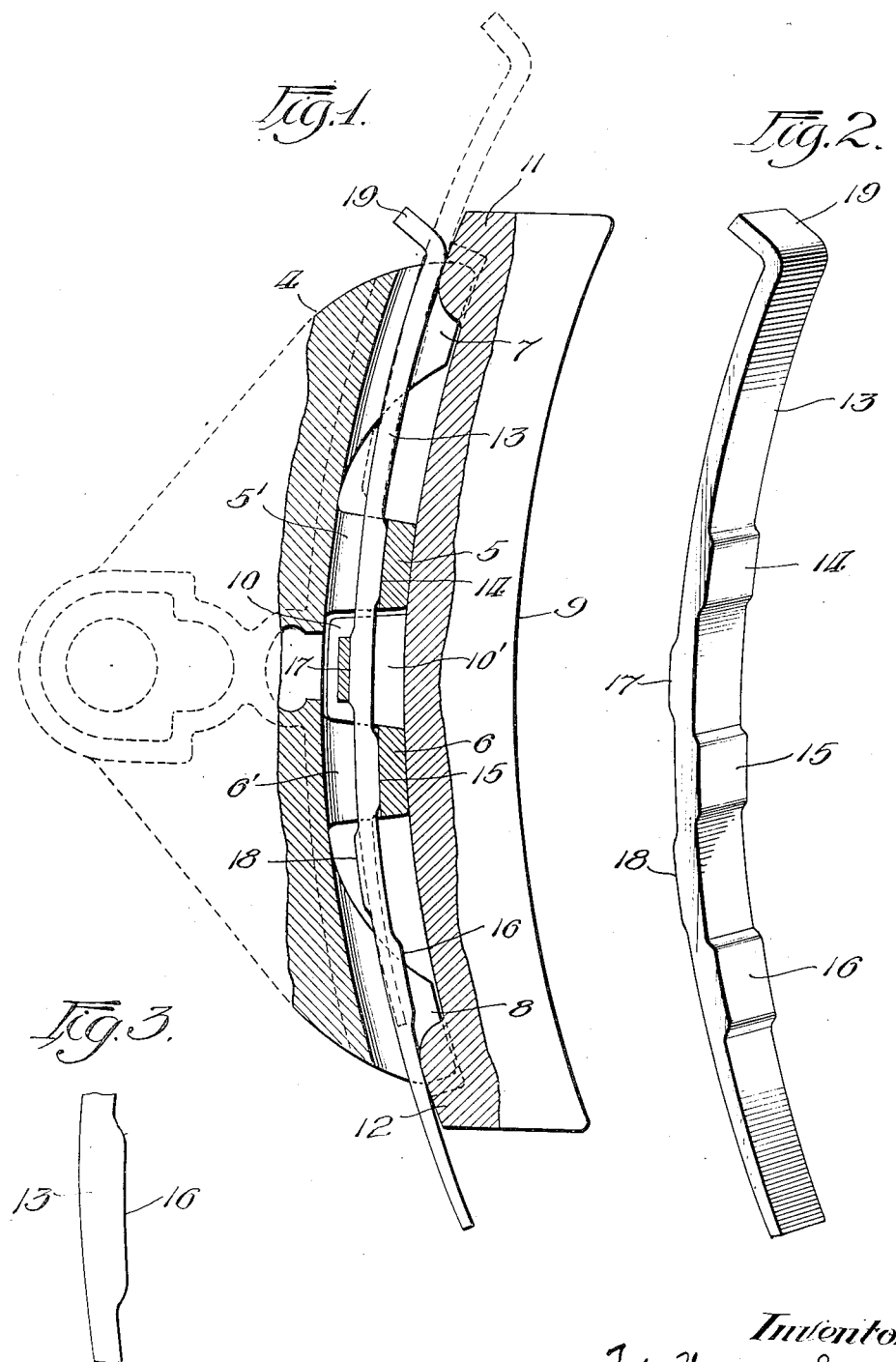
Inventor
Fitz William Sargent
By Wm. O. Bell
Attorney Patented July 3, 1934

UNITED STATES PATENT OFFICE 1,965,159

BRAKE SHOE KEY

Fitz William Sargent, Mahwah, N. J., assignor to The American Brake Shoe and Foundry Company, Wilmington, Del., a corporation of Delaware Application May 5, 1932, Serial No. 609,460

3 Claims. (Cl. 188—243)

This invention relates to keys for securing brake shoes to brake heads and its object is to provide a novel key which will take a wedge fit when driven into the keyway of a brake head and brake shoe to tightly and securely hold a new or an old shoe to a new or an old head and thereby reduce the wear between the head and the shoe and prolong the life thereof.

Another object of the invention is to provide an untempered mild steel key having bosses located to engage the lugs on the brake head and the brake shoe within a substantial range of position of the shoe on the head and adapted to be driven into place and take a set with a wedge fit in the key way and hold the shoe tightly and securely on the head.

And a further object is to provide a key which can be driven to a wedge fit in the keyway of a brake head and a brake shoe and which will not lose its effect as a wedge key in service but will continue at all times to hold the shoe tightly to the head.

And a still further object of the invention is to provide a wedge key for holding a brake shoe on a brake head which will be free from the distortions and strains of a tempered key, which will take a set when driven to locking position in the keyway of the head and shoe, and which will not lose its locking effect because of heat conditions or fatigue of metal.

In the accompanying drawing illustrating a selected embodiment of the invention

Fig. 1 is an elevation partly in section showing a key embodying my invention and securing a shoe in a brake head.

Fig. 2 is a perspective elevation of the key, and

Fig. 3 is a detail enlarged fragmentary view of the key.

Referring to the drawing, 4 is a head having lugs 5, 6 and toes 7, 8; and 9 is a brake shoe having an attaching lug 10 and end lugs 11, 12. The lugs 5, 6 of the head have openings 5', 6', and the attaching lug of the shoe has an opening 10', and these openings form a keyway to receive the key 13. The key is made of untempered mild steel in the form of a flat tapered bar and it is provided with bosses 14, 15 and 16 on one side and bosses 17 and 18 on its opposite side, these bosses being arranged in staggered relation. Each boss may be, and preferably is, tapered in accordance with the general taper of the key and as shown in Fig. 3. The key may be provided with a head 19 or of any other form desired.

When the key is inserted in the keyway of a new shoe and head the bosses 15 and 16 will engage the lugs 5 and 6 and the boss 18 will engage the lug 10, as shown in broken lines in Fig. 1, and when the key is driven into final position the bosses 14 and 15 engage the lugs 5 and 6, and the boss 17 engages the lug 10, as shown in full lines in Fig. 1. The bosses are preferably so proportioned with respect to the keyway that force is required to drive the key to its final position and, since the key is made of untempered mild steel, these bosses will be reshaped or deformed more or less, as by forging, when they are driven into final position in the keyway and they, and the key as a whole, will take a wedge fit set in the keyway which will continue during the life of the shoe.

The key is thickest through the upper boss 14 and gradually reduces in thickness through the other bosses to facilitate inserting the key in the keyway and driving the key to its final set therein. The head wears in service where the shoe lug 10 rests upon the head lug 6 and the end lug 11 engages the toe 7, and the bosses are of a length sufficient to insure a locking engagement with the lugs even when the head or the head and the shoe have been considerably worn. Thus a new shoe may be securely locked with my key in an old and badly worn head. My key will hold a new shoe in a new head so snugly that vibration of the shoe on the head is materially reduced so that there will be comparatively little wear between the shoe and head and whatever wear there is will be compensated for by the wedge shaped key which always tends to tighten its fit in the keyway. To withdraw the key from the keyway it is often necessary to employ much force and heavy blows and this may result in breaking off the head of an ordinary key but an untempered mild steel key will stand much more abuse of this kind than an ordinary key.

I have shown the invention in a selected form and assembly but I do not restrict the invention to the particular form, construction and dimensions therein shown but reserve the right to make any changes within the scope of the following claims.

I claim:

1. The combination with a brake shoe head and a brake shoe having interfitting lugs provided with alined openings to form a keyway, of a tapered key made of untempered mild steel adapted to be driven into said keyway and having oppositely disposed bosses to take a wedge fit set in said lugs.

2. A brake shoe key having a plurality of bearing bosses on opposite faces thereof to engage the attaching lugs of a brake shoe and a brake shoe head, said key being made of untempered mild steel and said bosses adapted to be deformed when driven into engagement with said lugs to take a wedge fit set therein.

3. A brake shoe key having a bearing boss on one face to engage the attaching lug of a brake shoe and bearing bosses on its opposite face to engage the attaching lugs of a brake shoe head, said key being made of untempered mild steel and said bosses being elongated to permit engagement with the lugs within a range of longitudinal movement of the key with respect to said lugs and said bosses adapted to be deformed when driven into engagement with said lugs to take a wedge fit set therein.

FITZ WILLIAM SARGENT.